United States Patent
Kumasaka

(10) Patent No.: US 9,684,289 B2
(45) Date of Patent: Jun. 20, 2017

(54) POWER CONTROL DEVICE, SYSTEM, AND METHOD USING SWITCHES FOR FAST STABILIZATION OF A POWER SOURCE

(71) Applicant: ROHM CO., LTD., Kyoto (JP)

(72) Inventor: Hiroyuki Kumasaka, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 835 days.

(21) Appl. No.: 14/038,124

(22) Filed: Sep. 26, 2013

(65) Prior Publication Data

US 2014/0088786 A1    Mar. 27, 2014

(30) Foreign Application Priority Data

Sep. 26, 2012  (JP) ................. 2012-211707

(51) Int. Cl.
  G05B 15/02  (2006.01)
  H02M 3/158  (2006.01)
  H02M 1/00  (2006.01)

(52) U.S. Cl.
  CPC ............ *G05B 15/02* (2013.01); *H02M 3/158* (2013.01); *H02M 2001/0022* (2013.01)

(58) Field of Classification Search
  CPC .................. G05B 15/02; H02M 3/158; H02M 2001/0022
  See application file for complete search history.

(56) References Cited

U.S. PATENT DOCUMENTS

| | | | | |
|---|---|---|---|---|
| 2010/0001705 | A1* | 1/2010 | Takahashi | H02M 3/157 323/283 |
| 2011/0267016 | A1* | 11/2011 | Kajiyama | H02M 3/157 323/271 |
| 2012/0200331 | A1* | 8/2012 | Karlsson | H02M 3/156 327/175 |

FOREIGN PATENT DOCUMENTS

JP   2004170599 A   6/2004

OTHER PUBLICATIONS

Balogh 'A Practical Introduction to Digital Power Supply Control', Texas Instruments Incorporated (2005).*
Application Note 140, Linear Technology (2013).*

* cited by examiner

Primary Examiner — Mohammad Ali
Assistant Examiner — Bernard G Lindsay
(74) Attorney, Agent, or Firm — Cantor Colburn LLP

(57) ABSTRACT

A power control device includes a control circuit configured to control a power source as a control target; and a control calculation unit configured to calculate a manipulation amount by which the control circuit controls the power source, wherein when a disturbance occurs in the power source, the control calculation unit adjusts the manipulation amount based on a predetermined parameter in the manipulation amount during a disturbance occurrence period.

6 Claims, 5 Drawing Sheets

POWER CONTROL DEVICE, SYSTEM, AND METHOD USING SWITCHES FOR FAST STABILIZATION OF A POWER SOURCE

CROSS-REFERENCE TO RELATED APPLICATIONS

This application is based upon and claims the benefit of priority from Japanese Patent Application No. 2012-211707, filed on Sep. 26, 2012, the entire contents of which are incorporated herein by reference.

TECHNICAL FIELD

The present disclosure relates to a power control device, a power control system, and a power control method. More particularly, the present disclosure relates to a power control device, a power control system, and a power control method capable of quick stabilization.

BACKGROUND

In general, proportional integral (PI) control, proportional integral differential (PID) control, robust control, and the like have been known as control schemes for stabilizing a control amount of a control target.

A conventional feedback loop such as an analog PID control encounter limitations in transient response characteristics. Thus, an analog circuit may employ a method in which a current flowing in a coil is feedback controlled. This control method is called a current mode.

For example, an optical device may adjust a position of a correcting lens by using the PID control.

However, the optical device encounters a problem in that when disturbance occurs in the correcting lens as a control target, it takes a long period of time for the correcting lens to be stabilized.

When realizing the control method in the case of using a digital power source, an analog-to-digital (AD) converter for monitoring a current is required in addition to a voltage loop, thereby increasing external installation components such as a coil, a resistor, and the like, or the number of pins, and also increasing a circuit area and power consumption.

SUMMARY

The present disclosure provides some embodiments of a power control device, a power control system, and a power control method capable of stabilizing a control target within a short time.

According to one embodiment of the present disclosure, provided is a power control device, including: a control circuit configured to control a power source; and a control calculation unit configured to calculate a manipulation amount by which the control circuit controls the power source, wherein when disturbance occurs in the power source, the control calculation unit adjusts the manipulation amount based on a predetermined parameter during a disturbance occurrence period.

According to another embodiment of the present disclosure, provided is a power control system, comprising: a power control device including a control circuit configured to control a power source as a control target, and a control calculation unit configured to calculate a manipulation amount by which the control circuit controls the power source, wherein when disturbance occurs in the power source, the control calculation unit adjusts the manipulation amount based on a predetermined parameter during a disturbance occurrence period; and the power source being included in an electronic device or components of an electronic device.

According to another embodiment of the present disclosure, provided is a power control method, including: controlling a power source; and calculating a manipulation amount to control the power source, wherein in the calculating, when disturbance occurs in the power source, the manipulation amount is adjusted based on a predetermined parameter during a disturbance occurrence period.

BRIEF DESCRIPTION OF THE DRAWINGS

FIGS. 4A to 4D are graphical representations illustrating changes in an output voltage of the power source in the power control system according to the embodiment, wherein FIG. 4A illustrates a change in an output voltage when a voltage falls gradually, FIG. 4B illustrates a change in an output voltage when a voltage falls sharply, FIG. 4C illustrates a change in an output voltage when a voltage rises gradually, and FIG. 4D illustrates a change in an output voltage when a voltage rises sharply.

DETAILED DESCRIPTION

Figure 1:
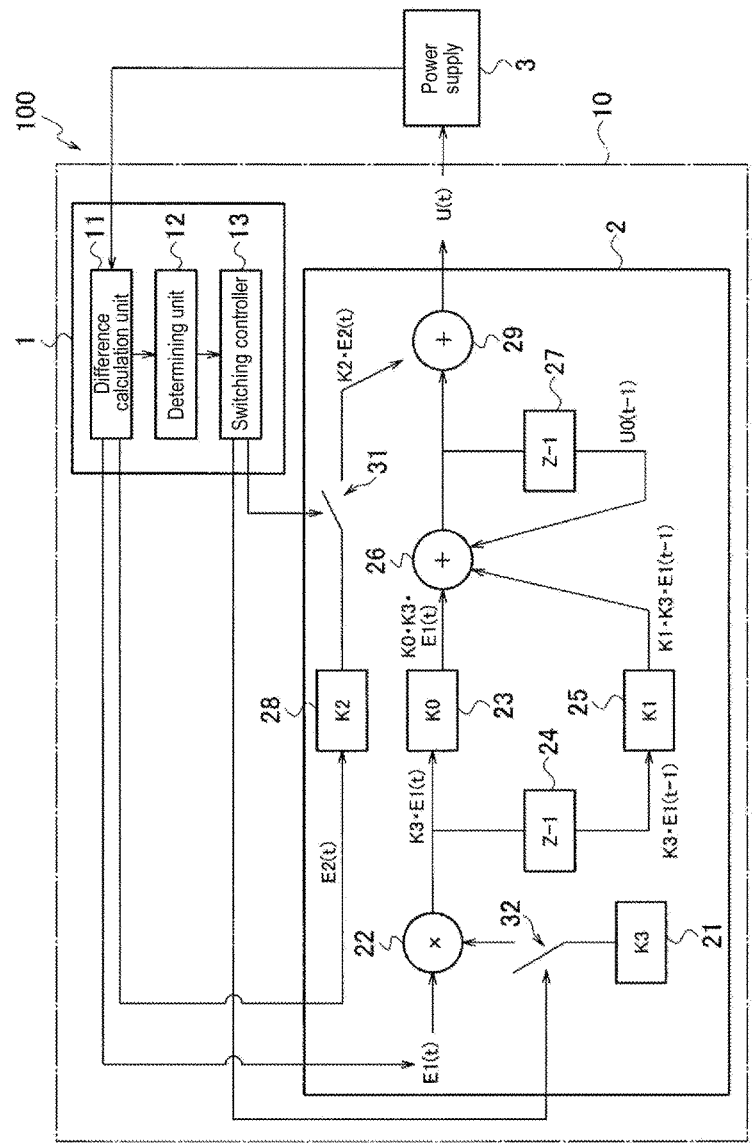
FIG. 1 is a schematic diagram illustrating a configuration of a power control system according to an embodiment of the present disclosure.

Embodiments of the present disclosure will be now described with reference to the drawings. In the following description of the drawings, the same or similar reference numerals are used for the same or similar parts.

The following embodiments are intended for illustrating devices or methods to embody the technical aspects of the present disclosure, but not for limiting the materials, features, structures, arrangements, and the like of the constituent parts of those set forth below. In the embodiments of the present disclosure, it is understood that various modifications or changes may be made, without departing from the scope of the present disclosure as defined in the following claims.

A first embodiment of the present disclosure will now be described in detail with reference to the drawings.

Configuration of Power Control System

FIG. 1 is a schematic diagram illustrating a configuration of a power control system 100 according to an embodiment of the present disclosure. As illustrated in FIG. 1, the power control system 100 includes a control circulation unit 1, a control circuit 2, and a power source, such as power supply 3, as a control target. Here, the control calculation unit 1 and the control circuit 2 comprise a power control device 10.

The power supply 3 may be a power source device or a step-down DC/DC converter that is used in any one of, for example, a liquid crystal TV, a monitor, a server, a computer, a point of load (POL), a mobile phone, a smart phone, a personal digital assistant (PDA), an optical disk device such as a portable media player, a digital camera, a wireless communication device, and the like, or a combination thereof. The power supply 3 is a control target that is feedback-controlled. An output voltage from the power supply 3 is detected, and the detected value is supplied to the control calculation unit 1.

The control calculation unit 1 calculates a manipulation amount by which the control circuit 2 controls the power supply 3. Specifically, when a disturbance occurs in the power supply 3, the control calculation unit 1 adjusts (or amplifies) the manipulation amount based on a predetermined parameter during a disturbance occurrence period.

The control circuit 2 controls the power supply 3 based on the manipulation amount.

Configuration of Control Calculation Unit

The control calculation unit 1 of the power control system 100 includes a difference calculation unit 11, a determining unit 12, and a switching controller 13.

At every control period, the difference calculation unit 11 calculates a reference value difference E1(t) indicating a difference between an output voltage from the power supply 3 and a predetermined reference voltage, and simultaneously calculates a lapse difference E2(t) indicating a difference between the output voltage from the power supply 3 and a previous output voltage from the power supply 3 before one control period.

The determining unit 12 determines whether or not a disturbance has occurred in the power supply 3 based on the output voltage from the power supply 3. More specifically, when an absolute value of the reference value difference E1(t) calculated by the difference calculation unit 11 exceeds a predetermined voltage threshold value $E_{TH1}$, the determining unit 12 determines that a first disturbance has occurred, and when an absolute value of the lapse difference E2(t) calculated by the difference calculation unit 11 exceeds the voltage threshold value $E_{TH1}$, the determining unit 12 determines that a second disturbance has occurred.

Further, when the absolute value of the reference value difference E1(t) and the absolute value of the lapse difference E2(t) calculated by the difference calculation unit 11 are less than an allowable voltage threshold value $E_{TH2}$ that has a lower value than the predetermined voltage threshold value $E_{TH1}$, the determining unit 12 determines that the absolute value of the reference value difference E1(t) or the lapse difference E2(t) is within a tolerance range.

When it is determined by the determining unit 12 that a disturbance has occurred, the switching controller 13 applies a predetermined parameter by turning on at least one of a first switch 31 and a second switch 32. More specifically, when it is determined by the determining unit 12 that the first disturbance has been detected, the switching controller 13 turns on the second switch 32 to apply a parameter K3, and when it is determined by the determining unit 12 that the second disturbance has been detected, the switching controller 13 turns on the first switch 31 to apply a parameter K2 and simultaneously turns on the second switch 32 to apply the parameter K3.

When it is determined by the determining unit 12 that it is within the tolerance range, the switching controller 13 turns off the first switch 31 and the second switch 32 to stop applying the parameters K2 and K3.

Configuration of Control Circuit

The control circuit 2 generates a signal indicating an amount of voltage manipulation, i.e., manipulation amount U(t) based on the reference value difference E1(t) and the lapse difference E2(t) supplied from the control calculation unit 1.

The control circuit 2 includes a memory 21, a multiplier 22, coefficient operators 23, 25, and 28, shift operators 24 and 27, adders 26 and 29, the first switch 31, and the second switch 32.

The memory 21 stores the parameter K3 for amplifying the manipulation amount U(t).

The multiplier 22 multiplies the parameter K3 stored in the memory 21 to the reference value difference E1(t) supplied from the control calculation unit 1, to output K1·E1(t).

The coefficient operator 23 multiplies a parameter K0 to K3·E1(t) output from the multiplier 22.

The shift operator 24 shift-operates K3·E1(t) output from the multiplier 22, to calculate K3·E1(t−1), which was K3·E1(t) before one control period.

The coefficient operator 25 multiplies a parameter K1 to K3·E1(t−1) shift-operated by the shift operator 24, to output K1·K3·E1(t−1).

The adder 26 adds K0·K3·E1(t) output from the coefficient operator 23, K1·K3·E1(t−1) output from the coefficient operator 25, and U0(t−1) output from the shift operator 27, to output U0(t)(=K0·K3·E1(t)+K1·K3·E1(t−1)+U0(t−1)).

The shift operator 27 shift-operates U0(t) output from the adder 26 to calculate U0(t−1), which was U0(t) before one control period.

The coefficient operator 28 multiplies the parameter K2 to the lapse difference E2(t) supplied from the control calculation unit 1.

The adder 29 adds K2·E2(t) output from the coefficient operator 28 to U0(t) output from the adder 26 to calculate the manipulation amount U(t) and outputs the manipulation amount U(t) to the power supply 3.

The first switch 31 is turned on and off according to an instruction from the switching controller 13 of the control calculation unit 1 to be described later. When the first switch 31 is turned on, K2·/E2(t) output from the coefficient operator 28 is added in the adder 29.

The second switch 32 is turned on and off according to an instruction from the switching controller 13 of the control calculation unit 1 to be described later. When the second switch 32 is turned on, the parameter K3 stored in the memory 21 is multiplied to the reference value difference E1(t) supplied from the control calculation unit 1, in the multiplier 22.

That is, when the parameters are K0 and K1, the manipulation amount is U(t), the manipulation amount before one control period is U0(t−1), and the reference value difference before one control period is E1(t−1), the first switch 31 switches application of the parameter K2 in Eq. (1) set forth below, and the second switch 32 switches application of the parameter K3 in Eq. (1).

$$U(t)=K0·K3·E1(t)+K1·K3·E1(t-1)+U0(t-1)+K2·E2(t) \qquad \text{Eq. (1)}$$

Figure 2:
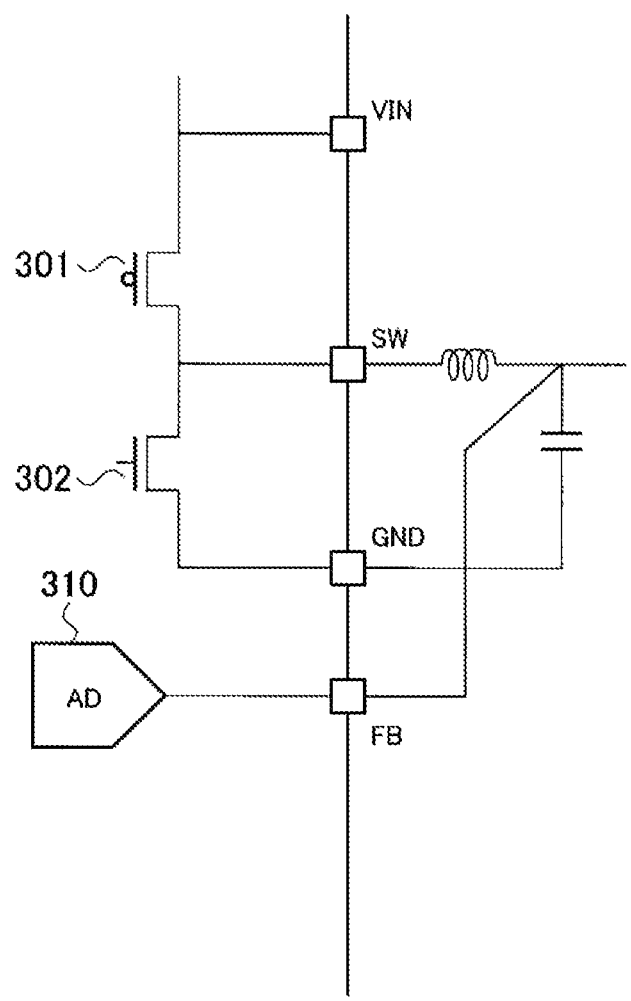
FIG. 2 is a circuit diagram illustrating a circuit configuration of a power source in the power control system according to the embodiment.

FIG. 2 is a circuit diagram illustrating a circuit configuration of the power supply 3 of the power control system 100 according to the embodiment.

As illustrated in FIG. 2, the power supply 3 includes switching elements 301 and 302, terminals GND, IN, SW and FB, and an AD converter 310.

The switching elements 301 and 302 are configured as, for example, transistors, or the like, and perform a switching operation.

GND is a ground terminal.

VIN is an input terminal.

SW is a switching output terminal of a step-down DC/DC converter.

FB is a voltage detection terminal.

The AD converter 310 detects an output voltage of the FB and supplies the detected voltage value to the control calculation unit 1.

Operation of Power Control Device

Figure 3:
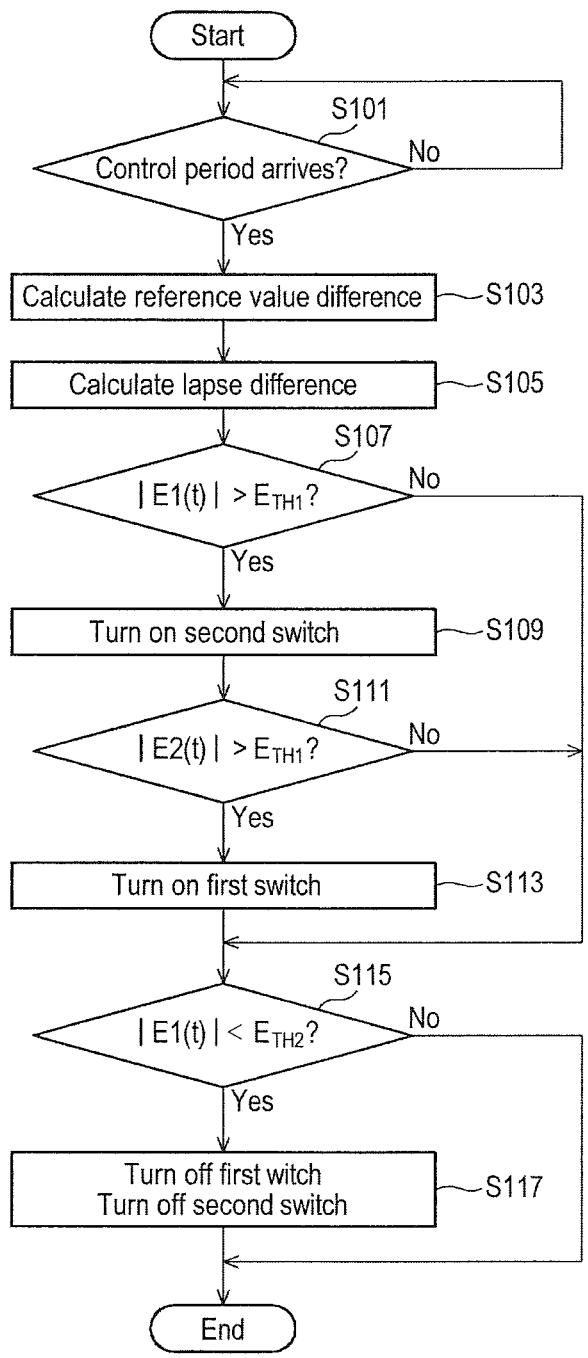
FIG. 3 is a flow chart illustrating a processing sequence of a power control device provided in the power control system according to the embodiment.

FIG. 3 is a flow chart illustrating a processing sequence of the power control device 10 provided in the power control system 100 according to the embodiment.

(a) As illustrated in FIG. 3, the control calculation unit 1 of the power control device 10 determines whether a control period is detected (step S101). For example, when a control period is 10 ms, the process of this flow chart is executed at every 10 ms.

(b) When the control period is determined (in case of YES) in step S101, the difference calculation unit 11 calculates a reference value difference E1(t) (step S103). More specifically, the difference calculation unit 11 calculates the reference value difference E1(t) indicating a difference between an output voltage supplied from the AD converter 310 of the power supply 3 and a predetermined reference voltage $V_{REF}$.

(c) The difference calculation unit 11 calculates a lapse difference E2(t) at step S105. Specifically, the difference calculation unit 11 calculates the lapse difference E2(t) indicating a difference between the output voltage from the power supply 3 and an output voltage before one control period.

(d) Next, the determining unit 12 determines whether an absolute value of the reference value difference E1(t) calculated by the difference calculation unit 11 exceeds a predetermined voltage threshold value $E_{TH1}$ (step S107). Here, the predetermined voltage threshold value $E_{TH1}$ is a value for determining sensitivity of detection of disturbance. If the predetermined voltage threshold value $E_{TH1}$ is set to be too high, it is difficult to determine whether disturbance has occurred, making it difficult for the second switch 32 to operate. If the predetermined voltage threshold value $E_{TH1}$ is set to be too low, it is easy to determine that a disturbance has occurred, making it easy for the second switch 32 to operate. Thus, it is necessary to set the predetermined voltage threshold value $E_{TH1}$ at an appropriate value in advance.

(e) When it is determined that the absolute value of the reference value difference E1(t) exceeds the predetermined voltage threshold value $E_{TH1}$ (in case of YES) in step S107, the determining unit 12 determines that a first disturbance has occurred, and the switching controller 13 turns on the second switch 32 (step S109). Accordingly, the parameter K3 stored in the memory 21 is supplied to the multiplier 22, and thus, the multiplier 22 multiplies the parameter K3 supplied from the memory 21 to the reference value difference E1(t) supplied from the control calculation unit 1, to output K3·E1(t).

(f) Next, the determining unit 12 determines whether an absolute value of the lapse difference E2(t) calculated by the difference calculation unit 11 exceeds the predetermined voltage threshold value $E_{TH1}$ (step S111).

(g) When it is determined that the absolute value of the lapse difference E2(t) exceeds the predetermined voltage threshold value $E_{TH1}$ (in case of YES) in step S111, the determining unit 12 determines that a second disturbance has occurred, and the switching controller 13 turns on the first switch 31 (step S113). Accordingly, the coefficient operator 28 supplies K2·E2(t) obtained by multiplying the parameter K2 to the lapse difference E2(t) supplied from the control calculation unit 1, to the adder 29, and the adder 29 adds K2·E2(t) output from the coefficient operator 28 to U0(t) output from the adder 26 to calculate the manipulation amount U(t), and outputs the same to the power supply 3, thereby applying the parameter K2 in the manipulation amount U(t).

(h) Next, the determining unit 12 determines whether the absolute value of the reference value difference E1(t) calculated by the difference calculation unit 11 is less than an allowable voltage threshold value $E_{TH2}$ (step S115). Here, the allowable voltage threshold value $E_{TH2}$ is set in advance such that an absolute value thereof is smaller than the absolute value of the voltage threshold value $E_{TH1}$.

(i) When it is determined that the absolute value of the reference value difference E1(t) is less than the allowable voltage threshold value $E_{TH2}$ (in case of YES) in step S115, the switching controller 13 turns off the first switch 31 and simultaneously turns off the second switch 32 (step S117). Accordingly, the parameters K2 and K3 cannot be applied in the manipulation amount U(t).

Figure 4A:
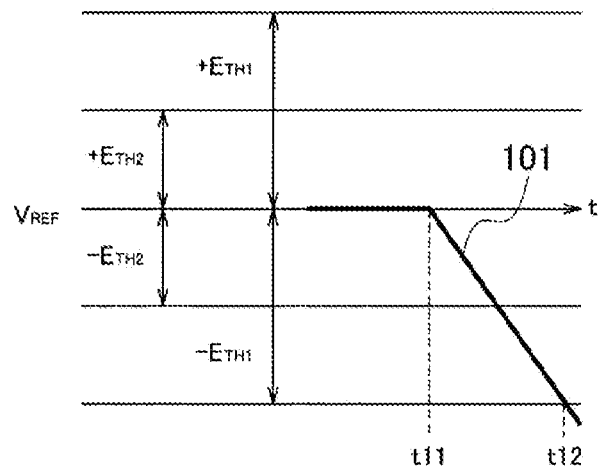

FIGS. 4A to 4D are graphical representations illustrating changes in an output voltage from the power supply 3 of the power control system 100 according to the embodiment of the present disclosure. FIG. 4A graphically illustrates a change in an output voltage when a voltage falls gradually, FIG. 4B graphically illustrates a change in an output voltage when a voltage falls sharply, FIG. 4C graphically illustrates a change in an output voltage when a voltage rises gradually, and FIG. 4D graphically illustrates a change in an output voltage when a voltage rises sharply.

As illustrated in FIG. 4A, when an output voltage 101 falls at a point of time t11 and the reference value difference E1(t) indicating a difference between the output voltage $V_{OUT}$ and the reference voltage $V_{REF}$, is less than $-E_{TH1}$ at a point of time t12, the determining unit 12 determines that a first disturbance has occurred, and the switching controller 13 turns on the second switch 32.

Figure 4B:
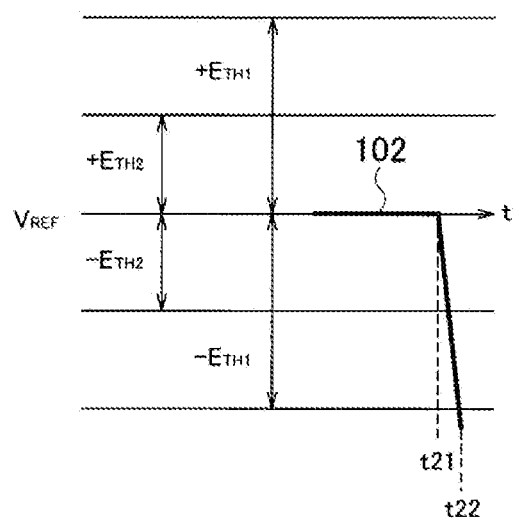

Further, as illustrated in FIG. 4B, an output voltage 102 falls at a point of time t21, and the reference value difference E1(t) indicating a difference between the output voltage $V_{OUT}$ and the reference voltage $V_{REF}$, is less than $-E_{TH1}$ at a point of time t22. In comparison to the output voltage 101 illustrated in FIG. 4A, the degree of voltage drop is sharp and the lapse difference E2(t) is less than $-E_{TH1}$ at the point of time t22. In this case, the determining unit 12 determines that a second disturbance has occurred, and the switching controller 13 further turns on the first switch 31.

Figure 4C:
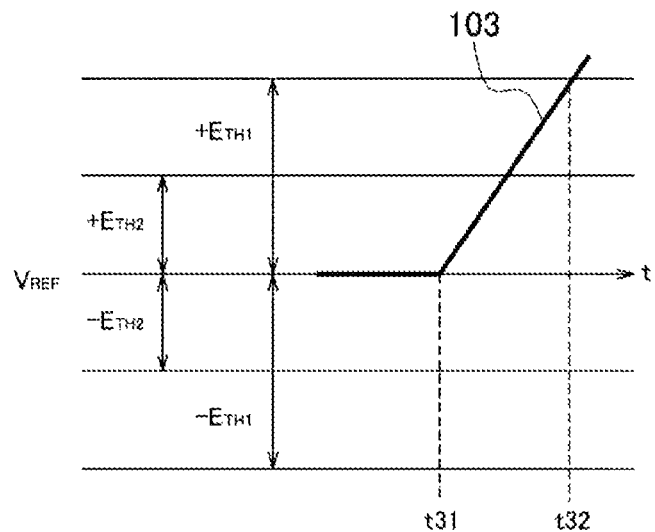

Further, as illustrated in FIG. 4C, when an output voltage 103 rises at a point of time t31 and the reference value difference E1(t) indicating a difference between the output voltage $V_{OUT}$ and the reference voltage $V_{REF}$, exceeds $E_{TH1}$ at a point of time t32, the determining unit 12 determines that the first disturbance has occurred, and the switching controller 13 turns on the second switch 32.

Figure 4D:
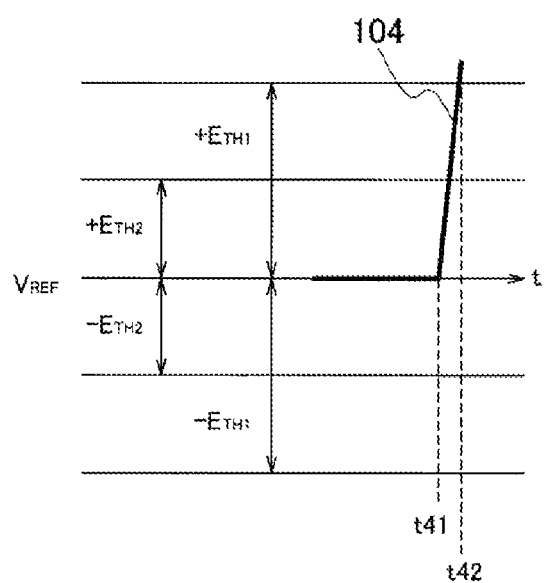

Further, as illustrated in FIG. 4D, an output voltage 104 rises at a point of time t41, and the reference value difference E1(t) indicating a difference between the output voltage $V_{OUT}$ and the reference voltage $V_{REF}$, exceeds $E_{TH1}$ at a point of time t42. In comparison to the output voltage 103 illustrated in FIG. 4C, the degree of voltage rise is sharp and the lapse difference E2(t) exceeds $E_{TH1}$ at the point of time t42. In this case, the determining unit 12 determines that the second disturbance has occurred, and the switching controller 13 further turns on the first switch 31.

That is, when it is determined that the absolute value of the reference value difference E1(t) exceeds the predetermined voltage threshold value $E_{TH1}$, it is determined that the first disturbance has occurred, and the switching controller 13 turns on the second switch 32, and further, when it is determined that the absolute value of the lapse difference E2(t) exceeds the predetermined voltage threshold value $E_{TH1}$, it is determined that the second disturbance has occurred, and the switching controller 13 turns on the first switch 31.

Accordingly, since whether or not to apply the parameters K2 and K3 in the manipulation amount U(t) is determined based on the reference value difference E1(t) and the lapse difference E2(t) of the output voltage, the manipulation amount U(t) can be changed depending on the degree of rise or drop of the output voltage, and even when a disturbance occurs, a control target can be stabilized within a short time.

As described above, according to the power control system 100 of the present embodiment, since the transient response characteristics are significantly improved in comparison to the conventional power control device, the control target, i.e., the power supply 3 can be stabilized within a short time.

According to the power control system 100 of the embodiment, since whether disturbance has occurred in the power supply 3 is determined based on an output voltage from the power supply 3, it is not necessary to install an AD converter and the number of external installation components such as a coil, a resistor, and the like, or the number of pins can be reduced. Accordingly, a circuit area can be reduced, which in turn reduces power consumption as well. Further, since the circuit configuration is simplified, reliability can be enhanced.

In addition, according to the power control system of the present embodiment, a gain is not required in the main feedback loop, and since the number of bits of the circulation circuit can be reduced to use a small coefficient, the number of gates can also be reduced, and thus, cost can be reduced and reliability can be enhanced.

Furthermore, the power control method according to the embodiment includes a control step of controlling the power source as a control target and a control calculation step of calculating a manipulation amount to control the power source, and in the control calculation step, when disturbance occurs in the power source, a predetermined parameter is applied in the manipulation amount to adjust (or amplify) the manipulation amount during a disturbance occurrence period.

In this manner, the power control device, the power control system, and the power control method capable of stabilizing a control target within a short time can be provided.

The power control device according to the present disclosure may be applied to electronic devices such as a liquid crystal TV, a monitor, a server, a computer, a point of load (POL), a mobile phone, a smart phone, a personal digital assistant (PDA), an optical disk device, a digital camera, a wireless communication device, and the like.

While certain embodiments have been described, these embodiments have been presented by way of example only, and are not intended to limit the scope of the present disclosure. Indeed, the novel methods and apparatuses described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A power control device, comprising:
a control circuit configured to control a power source; and
a control calculation unit configured to calculate a manipulation amount by which the control circuit controls the power source, the control calculation unit comprising:
a difference calculation unit configured to calculate a reference value difference between an output voltage from the power source and a predetermined reference voltage and a lapse difference between the output voltage from the power source and an output voltage before one control period;
a determining unit configured to determine that a first disturbance has occurred in the power source based on the reference value difference and that a second disturbance has occurred in the power source based on the lapse difference; and
a switching control unit configured to adjust the manipulation amount, based on one or more predetermined parameters, to apply a first manipulation amount when the determining unit determines that the first disturbance has occurred and apply a second manipulation amount when the determining unit determines that the second disturbance has occurred,
wherein the control circuit comprises a switch configured to switch application of at least one of the predetermined parameters,
wherein the switching control unit is further configured to apply at least one of the predetermined parameters by turning on the switch based on the determination that the first disturbance has occurred or the determination that the second disturbance has occurred, and
wherein when the reference value difference is E1(t), the lapse difference is E2(t), parameters K0, K1, K2, and K3 are the predetermined parameters, the manipulation amount is U(t), the manipulation amount before one control period is U0(t−1), and the reference value difference before one control period is E1(t−1), the switch has a first switch configured to switch application of the parameter K2 in Eq. (1) set forth below, and a second switch configured to switch application of the parameter K3 in Eq. (1), $$U(t)=K0 \cdot K3 \cdot E1(t)+K1 \cdot K3 \cdot E1(t-1)+U0(t-1)+K2 \cdot E2(t) \qquad \text{Eq. (1)},$$

when an absolute value of the reference value difference calculated by the difference calculation unit exceeds a predetermined voltage threshold value, the determining unit determines that the first disturbance has occurred, and when an absolute value of the lapse difference calculated by the difference calculation unit exceeds the predetermined voltage threshold value, the determining unit determines that the second disturbance has occurred, and
when it is determined by the determining unit that the first disturbance has been detected, the switching control unit applies the parameter K3 by turning on the second switch, and when it is determined by the determining unit that the second disturbance has been detected, the switching control unit applies the parameter K2 by turning on the first switch and simultaneously applies the parameter K3 by turning on the second switch.

2. The power control device of claim 1, wherein when the absolute value of the reference value difference calculated by the difference calculation unit is less than an allowable voltage threshold value that is lower than the predetermined voltage threshold value, the determining unit determines that it is within a tolerance range, and when it is determined by the determining unit that the absolute value is within the tolerance range, the switching control unit turns off the second switch to stop application of the parameter K3.

3. The power control device of claim 1, wherein the power source is a step-down DC/DC converter.

4. A power control system, comprising:
a power source included in an electronic device or components of an electronic device; and
a power control device comprising:
a control circuit configured to control the power source; and
a control calculation unit configured to calculate a manipulation amount by which the control circuit controls the power source, the control calculation unit comprising:
a difference calculation unit configured to calculate a reference value difference between an output voltage from the power source and a predetermined reference voltage and a lapse difference between the output voltage from the power source and an output voltage before one control period;
a determining unit configured to determine that a first disturbance has occurred in the power source based on the reference value difference and that a second disturbance has occurred in the power source based on the lapse difference; and
a switching control unit configured to adjust the manipulation amount, based on one or more predetermined parameters, to apply a first manipulation amount when the determining unit determines that the first disturbance has occurred and apply a second manipulation amount when the determining unit determines that the second disturbance has occurred,
wherein the control circuit comprises a switch configured to switch application of at least one of the predetermined parameters,
wherein the switching control unit is further configured to apply at least one of the predetermined parameters by turning on the switch based on the determination that the first disturbance has occurred or the determination that the second disturbance has occurred, and
wherein when the reference value difference is E1(t), the lapse difference is E2(t), parameters K0, K1, K2, and K3 are the predetermined parameters, the manipulation amount is U(t), the manipulation amount before one control period is U0(t−1), and the reference value difference before one control period is E1(t−1), the switch has a first switch configured to switch application of the parameter K2 in Eq. (1) set forth below, and a second switch configured to switch application of the parameter K3 in Eq. (1), $$U(t)=K0 \cdot K3 \cdot E1(t)+K1 \cdot K3 \cdot E1(t-1)+U0(t-1)+K2 \cdot E2(t) \quad \text{Eq. (1)},$$

when an absolute value of the reference value difference calculated by the difference calculation unit exceeds a predetermined voltage threshold value, the determining unit determines that the first disturbance has occurred, and when an absolute value of the lapse difference calculated by the difference calculation unit exceeds the predetermined voltage threshold value, the determining unit determines that the second disturbance has occurred, and when it is determined by the determining unit that the first disturbance has been detected, the switching control unit applies the parameter K3 by turning on the second switch, and when it is determined by the determining unit that the second disturbance has been detected, the switching control unit applies the parameter K2 by turning on the first switch and simultaneously applies the parameter K3 by turning on the second switch.

5. The power control system of claim 4, wherein the electronic device is any one of a liquid crystal TV, a monitor, a server, a computer, a point of load (POL), a mobile phone, a smart phone, a personal digital assistant (PDA), an optical disk device, a digital camera, and a wireless communication device, or a combination thereof.

6. A power control method, comprising:
controlling a power source; and
calculating a manipulation amount to control the power source,
wherein the calculating comprises:
calculating a reference value difference between an output voltage from the power source and a predetermined reference voltage;
calculating a lapse difference between the output voltage from the power source and an output voltage before one control period;
determining that a first disturbance has occurred in the power source based on the reference value difference;
determining that a second disturbance has occurred in the power source based on the lapse difference;
adjusting the manipulation amount, based on one or more predetermined parameters, to apply a first manipulation amount when the determining unit determines that the first disturbance has occurred and apply a second manipulation amount when the determining unit determines that the second disturbance has occurred,
wherein the controlling comprises switching, by a switch, application of at least one of the predetermined parameters,
wherein the adjusting comprises applying at least one of the predetermined parameters by turning on the switch based on the determination that the first disturbance has occurred or the determination that the second disturbance has occurred, and
wherein when the reference value difference is E1(t), the lapse difference is E2(t), parameters K0, K1, K2, and K3 are the predetermined parameters, the manipulation amount is U(t), the manipulation amount before one control period is U0(t−1), and the reference value difference before one control period is E1(t−1), the switch has a first switch configured to switch application of the parameter K2 in Eq. (1) set forth below, and a second switch configured to switch application of the parameter K3 in Eq. (1), $$U(t)=K0 \cdot K3 \cdot E1(t)+K1 \cdot K3 \cdot E1(t-1)+U0(t-1)+K2 \cdot E2(t) \quad \text{Eq. (1)},$$

when an absolute value of the reference value difference exceeds a predetermined voltage threshold value, it is determined that the first disturbance has occurred, and when an absolute value of the lapse difference exceeds the predetermined voltage threshold value, it is determined that the second disturbance has occurred, and when it is determined that the first disturbance has been detected, the parameter K3 is applied by turning on the second switch, and when it is determined that the second disturbance has been detected, the parameter K2 is applied by turning on the first switch and simultaneously the parameter K3 is applied by turning on the second switch.

* * * * *